United States Patent Office 2,908,579
Patented Oct. 13, 1959

2,908,579

BARIUM TITANATE INSULATORS

Karl E. Nelson, Urbana, Ill., and Hans Thurnauer, St. Paul, Minn., assignors to American Lava Corporation, Chattanooga, Tenn., a corporation of Tennessee No Drawing. Application June 23, 1955
Serial No. 517,657

11 Claims. (Cl. 106—39)

This invention relates to the manufacture of barium titanate insulator bodies and compositions for use therein, and in particular provides methods and compositions for making barium titanate insulator bodies having substantially constant, i.e., only slightly changing, dielectric properties with the passage of time.

Barium titanate for use in making insulator bodies has generally been prepared, on a commercial scale, by heating together stoichiometric amounts of barium carbonate and titanium dioxide at calcining temperatures. Temperatures usually above 1000° C. are needed in order to gain a reaction between the constituents, and it is desirable to carry out the reaction at even higher temperatures, e.g., 1250° C., where the reaction requires less time for completion. The resulting calcine, known as "technical grade" or "commercial" barium titanate, is the most economical form of barium titanate on the market. In powdered form, usually with other materials such as fluxes mixed therewith, it is pressed and fired to produce a desired ceramic insulator body. A body prepared from this calcine, however, exhibits a substantial drop in dielectric constant with the passage of time. For many purposes, maintenance of substantially unchanged dielectric constant values over lengthy periods of time is imperative, and hence these unstable prior art ceramic barium titanate insulator bodies have in many cases been found inadequate.

The present invention is directed toward a solution to this problem and provides effective and economical procedures, employing readily available and economical raw materials, for making barium titanate ceramic insulator bodies which are stable against great changes in dielectric constant over long periods of time. Bodies which exhibit as little as a fraction of 1% drop in dielectric constant in 1000 hours' time may be prepared according to the teachings hereof.

To provide a standard of measurement for the phenomenon of aging, i.e., drops in dielectric constant with time, the following test procedure is offered. To make a capacitor for test purposes a vitrified test piece, which may for example be a disc one inch in diameter and 0.06 inch thick, is coated on opposite faces with uniform layers of electrically conductive silver paint (a suitable paint is No. 4822, conductive coating, marketed by E. I. du Pont de Nemours Company, which by analysis contains about 65% silver, about 2% $B_2O_3$, about 2% $B_2O$, about 2% PbO, and about 29% of volatile organic constituents) and fired in a suitable kiln, such as an electric muffle tunnel kiln, at approximately 770° C. for 30 minutes. After firing on these conducting electrodes, the test piece is heated in any suitable oven or kiln to approximately 150° C. (always above the curie temperature of barium titanate) for approximately 10 minutes and is then transferred directly to a cabinet maintained at a constant temperature of 25±0.1° C. The capacity value measured at 25±0.1° C. and 15 minutes after being placed in the constant temperature cabinet is considered to be the zero-time capacity value. At the end of 1000 hours the capacity value of the test piece is again measured. Electrical measurements may be made at intermediate points of time, between ¼ to 1000 hours or continued beyond 1000 hours, for the purpose of plotting a graph showing the aging curve, i.e., the rate and amount of drop of capacitance (corresponding to dielectric constant) inherent in the body being tested. At no time are the samples removed from the constant temperature cabinet while electrical aging measurements are in progress.

The percent of aging at any point in time is determined according to the following formula:

$$\text{Percent aging} = \frac{C_0 - C_t}{C_0} \times 100$$

where $C_0$ equals the capacitance of the body at zero time and $C_t$ equals the capacitance at the end of a definite period of time. Since the dielectric constant is directly proportional to capacitance, the percent decrease in capacitance, as a value, likewise represents the percent of decrease in dielectric constant manifested by a body.

A General Radio capacitance bridge, model 716-C, provides a suitable measuring system for determining capacitance. A test frequency of 1 kc. and a test voltage of just under 5 volts R.M.S. is employed. Measurements at various temperatures are made if it is desired to establish TC curves, explained below.

We have found that two readily available raw materials, barium carbonate and titanium dioxide, may be reacted in the presence of an oxygen-containing compound of bismuth at calcining temperatures to produce a novel barium titanate calcine which, when fired to vitrification produces ceramic insulator bodies that substantially retain their original dielectric constant values with the passage of time.

Instead of using barium carbonate in the calcining reaction, equivalent barium compounds may be employed. For example, barium oxide, barium nitrate, barium oxalate, etc. as well as others may be used as the starting barium-oxygen compound for the reaction here set forth. The great number and variety of equivalent barium compounds employable in the teaching hereof will be readily appreciated by anyone skilled in the art. Barium carbonate, of course, is much more economical than other compounds mentioned and, in that respect, is preferred as the reactant, but it is to be understood that others are within the scope hereof.

Titanium dioxide will generally be employed in the reaction although equivalent compounds of titanium likewise may be used.

Typical oxygen-containing compounds of bismuth which give the improved results in the process hereof are $Bi_2O_3$, $Bi_2(SnO_3)_3$, $(BiO)_2CO_3$, $Bi(NO_3)_3$, $Bi_2O_5$, etc. Except for $Bi_2O_3$ and $Bi_2(SnO_3)_3$, the oxygen-containing bismuth compounds employable decompose under the conditions of the reaction, i.e., at or below calcining temperatures, to yield $Bi_2O_3$ and a volatile constituent. For best results only a minor amount of an oxygen containing bismuth compound is employed, although insulators containing as much as approximately 50% of an oxygen-containing bismuth compound, and even higher amounts, are useful for specialized applications where extremely high dielectric constant is not a primary consideration. It is generally preferred to use more than approximately 3 parts by weight of bismuth compound for every 100 parts by weight of barium titanate compound resulting from calcination, but useful compositions can result when slightly smaller amounts of bismuth compound are employed.

$Bi_2O_3$ present during calcination effectively reduces aging phenomenon in a vitrified body formed from the calcine, as may be seen from examples below, but a vitrified body formed from such a calcine exhibits somewhat higher power losses than desirable for most uses. For this reason some tin oxide is preferably mixed with the $Bi_2O_3$ (or compound yielding $Bi_2O_3$ upon decomposition). The tin oxide, however, need not be added to the mixture unless it is desired to achieve a reduction in power losses in the final vitrified body. However, it should be noted that $Bi_2O_3$ and $SnO_2$ together apparently behave synergistically inasmuch as vitrified bodies formed from a $BaTiO_3$ calcine-mixture reacted with both $Bi_2O_3$ and tin oxide admixed exhibit even lower aging tendencies than those made from a calcine-mixture reacted with only $Bi_2O_3$ admixed. $SnO_2$ alone, however, as the third component during calcination is ineffective. In fact, vitrified bodies formed from calcines so made (with $SnO_2$ alone) exhibit greater aging than bodies prepared using currently available commercial $BaTiO_3$. Stannic oxide, i.e., $SnO_2$, as well as tin compounds which yield $SnO_2$ under calcining conditions, e.g., $Sn(OH)_4$, etc., may be employed with the oxygen containing bismuth compound to achieve this result.

The required ingredients in the calcine-mix, i.e., the barium carbonate, titanium dioxide and oxygen containing bismuth compound (and, if desired, any optional ingredients to be used in the final vitrified body), are blended together to form a uniform mass by wet-milling, using water as the suspending medium. Dry mixing is also suitable as well as the use of other types of suspending media. Of course, the ingredients may be separately pulverized to a fine state and then blended, i.e., thoroughly mixed. In preparing the formulations hereof, milling was conducted in porcelain ball mills with flint pebbles for approximately 3 to 6 hours using approximately 200 grams of material (i.e., mixture of ingredients), 500 grams of pebbles, and enough water to cover the pebbles used. The material should be pulverized to a particle size smaller than approximately 150 mesh and preferably below 200 mesh. A particle size less than 200 mesh was used for the examples hereof.

After the preliminary size reduction of material, it may be calcined as a loose powder. It may be desirable to press the material into pellets prior to calcining to insure a more complete reaction at a lower temperature. For the examples hereof (unless otherwise stated), pellets 3 inches in diameter and ½ inch thick were pressed at a pressure of 5 tons per square inch. If desired, the material may be wetted with a volatile organic binder, e.g., a very dilute polyvinyl alcohol solution, to improve pressing qualities. The pellets are then calcined to effect a chemical reaction between the barium carbonate and titanium dioxide in the present of the uniformly dispersed oxygen containing bismuth compound. The effect that the bismuth compound imparts to the reacted product is illustrated in the specific examples to follow.

In preparing the examples hereof a calcining temperature of 1100° C. was used and maintained for approximately one hour. However, these particular conditions are not critical. For example, if the reaction is conducted at 1200° C., or even 1300° C., a shorter period of time is preferred and is generally used in order to prevent vitrification of the product. At somewhat lower calcining temperatures, a longer period of time is required. It is evident from the foregoing that calcining temperatures may vary considerably; however, they are generally high, that is, of the general order of 1100° C. in magnitude, as hereinbefore noted.

After calcination, the pellets are pulverized to a size on the order of −150 mesh or smaller, preferably smaller than 200 mesh, suitably by a wet-milling step such as was used for preparing the material to be calcined. In preparing the samples hereof, the puverized calcine-product was dried, wetted with a dilute solution of polyvinyl alcohol to improve pressing qualities, and pressed into specimens of 1 inch in diameter and 0.06 inch thickness at a force of 16,000 lbs. Other sizes may, of course, be used.

The specimens were then fired on a time-temperature schedule selected to produce dense vitrified ceramic bodies, i.e., bodies with little, if any porosity. The porosity of a vitrified body is so small that, in water absorption tests, less than 0.05% water is absorbed. If subjected to a fuchsine dye-alcohol solution under high pressure, these dense vitrified bodies are not appreciably penetrated by the dye. In preparing th examples hereof, the specimens were vitrified by firing in the temperature range of 1200° C. to 1375° C. with the maximum temperature being maintained for approximately ½ to 1 hour.

It should be noted that we may also prepare vitrified ceramic $BaTiO_3$ bodies directly from a blend of the raw materials used in making a calcine-product as aforedescribed. If this is done, the time of soak at the maximum temperature used for vitrification is extended. This variation of our process, however, is not preferred inasmuch as it is difficult to obtain dense vitrified bodies directly from starting reactants.

In order to illustrate the advantages of the process hereof, and specifically to show the outstanding reduction in aging tendency exhibited by bodies prepared according to this invention over similarly composed bodies prepared using the present form of barium titanate known as "commercial barium titanate," a series of vitrified bodies of varied composition were prepared and tested as hereinbefore described. In Table I, the dielectric constant and aging characteristics (percent drop in dielectric constant) of these bodies are set forth.

TABLE I

| Example No. | $Bi_2(SnO_3)_3$ parts by weight | Dielectric constant 25° C. | Percent aging at 1,000 hours |
| --- | --- | --- | --- |
| 1 | 4 | 1,898 | 4.0 |
| 1a | 4 | 2,249 | 11.2 |
| 2 | 7 | 1,761 | 2.5 |
| 2a | 7 | 1,642 | 12.1 |
| 3 | 10 | 1,637 | 2.5 |
| 3a | 10 | 1,448 | 11.2 |
| 4 | 15 | 1,312 | 1.0 |
| 4a | 15 | 1,100 | 8.6 |
| 5 | 20 | 1,150 | 0.7 |
| 5a | 20 | 902 | 7.8 |
| 6 | 25 | 862 | 0.3 |
| 6a | 25 | 752 | 6.0 |
| 7 | 43 | 574 | 0.0 |
| 7a | 43 | 602 | 5.6 |

The bodies of all examples in Table I were calculated on the basis of 100 parts $BaTiO_3$ by weight. Examples 1 through 7 inclusive were prepared using the process of this invention, i.e., calcining barium carbonate with titanium dioxide in the presence of an oxygen containing bismuth compound, as aforedescribed. Examples 1a through 7a inclusive were prepared using the marketed form of barium titanate known as "commercial barium titanate." All samples were matured at a temperature of 1250° C. held for ½ hour. As a further comparison, samples of barium titanate without any added component fired at 1375° C. (maintained for 1½ hours) have been found to exhibit aging rates generally at least well above 12% at the end of 1000 hours. Also of note is the fact that the aging rate of commercial barium titanate bodies increases pronouncedly at a point around approximately 10 hours in time, whereas the much lower aging rate of bodies prepared according to this invention remains substantially constant throughout this period.

From the table it may be observed that vitrified insulators made by the process of this invention exhibit well below half the amount of drop in dielectric constant and capacitance that is exhibited by similarly composed vitrified insulators containing barium titanate formed by calcining barium carbonate with $TiO_2$ in the absence of the oxygen containing bismuth compound but otherwise prepared using identical conditions.

Example 5 in the foregoing table exhibited other particularly beneficial electrical properties in addition to those aforementioned. Its power factor at 1000 cycles was 0.60% and over the temperature range of −55° C. to +85° C., its dielectric constant varied between the limits of 1093 and 1185. As its temperature was raised above 0° C. it exhibited a slight negative temperature coefficient of capacity which was not interrupted by any curie point or like phenomenon as higher temperatures, even as high as 150° C., were reached. This behaviour is generally characteristic of bodies prepared according to this invention.

In Table II we illustrate the effects obtained if our calcine-reaction is conducted using $Bi_2O_3$ alone as the third component. It will be readily apparent that the tendency toward aging is greatly inhibited, even though the power losses are somewhat greater than desirable. Each example was compounded on the basis of 100 parts $BaTiO_3$ formed as taught herein.

TABLE II

| Example No. | $Bi_2O_3$ parts by weight | Dielectric constant, 25° C. | Percent power factor | Percent aging at 1,000 hours |
|---|---|---|---|---|
| 8 | 8 | 1,146 | 2.63 | 4.2 |
| 9 | 16 | 963 | 2.87 | 2.8 |
| 10 | 20 | 997 | 2.73 | 2.8 |

Examples 8, 9 and 10 were fired to vitrification at 1350° C. maintaining the maximum temperature for ½ hour.

Table III illustrates several compositions prepared from a calcine the raw components of which were reacted in the presence of $Bi_2O_3$ with $SnO_2$ admixed in varying proportions. Each example contained amounts of $BaCO_3$ and $TiO_2$ calculated to produce 100 parts of $BaTiO_3$ and contained also 20.5 parts by weight of various mixtures of $Bi_2O_3$ and $SnO_2$. The number of mols of $SnO_2$ for every mol of $Bi_2O_3$ used in the calcination step are set forth in the table.

TABLE III

| Example No. | Mol ratios of $Bi_2O_3.SnO_2$ | Dielectric constant, 25° C. | Percent power factor | TC | Percent aging, 1,000 hours |
|---|---|---|---|---|---|
| 11 | $Bi_2O_3.SnO_2$ | 1,580 | 0.85 | 3/13 | 0.35 |
| 12 | $Bi_2O_3.2SnO_2$ | 1,150 | .44 | 3/10 | .55 |
| 13 | $Bi_2O_3.3SnO_2$ | 1,000 | .71 | 1/4 | .55 |
| 14 | $Bi_2O_3.4SnO_2$ | 1,065 | .78 | 1/3 | .50 |
| 15 | $Bi_2O_3.8SnO_2$ | 885 | .95 | 8/7 | 1.00 |

In the column labelled "TC" are set forth in abbreviated form the temperature-capacitance relationship (also the temperature-dielectric constant relationship) exhibited by the bodies in this table. The numerator indicates the maximum increase, and the denominator the maximum decrease, of capacity (and dielectric constant) exhibited by a body between the limits of −55° C. and +85° C. Values are expressed in percent of deviation from those values for capacitance and dielectric constant which the body exhibits at 25° C. For example, a body having a dielectric constant of 1000 at 25° C. and a TC relationship of 10/20 would vary in dielectric constant, over the temperature range of −55° C. to +85° C., between the limits of 800 and 1100. Now referring to Table III, the dielectric constant of Example 11 is seen to vary between the limits of 1375 and 1627 over the temperature range of −55° C. to +85° C. The change, of course, is not linear, there being a peak dielectric constant for this body (Example 11) at approximately minus 5° C. It exhibits, however, a negative capacity change (a slight decrease) with temperature above 0° C.

Example 16

| | Parts by weight |
|---|---|
| $BaCO_3$ | 84.62 |
| $TiO_2$ | 34.25 |
| $CaSnO_3$ | 1.57 |
| $PbSnO_3$ | 2.88 |
| $Bi_2(SnO_3)_3$ | 7.72 |

These ingredients were blended by wet-milling (particle size of −200 mesh) dried, and calcined at 1100° C. for one hour. Thereafter, the calcine was pulverized to a size of −200 mesh, an aqueous solution of polyvinyl alcohol mixed therewith, and discs pressed as aforedescribed. The discs were fired at a maximum temperature of 1375° C. held for ¾ hour. The resulting vitrified body exhibited a dielectric constant at 25° C. of 1900, a power factor of 1.2%, and 2% aging at the end of 1000 hours. Between −55° C. and +85° C. the dielectric constant of this body varied between the limits of 1710 and 1995. A similarly composed body made using commercial barium titanate exhibited 12.4% aging at the end of 1000 hours.

Calcine-reactions have also been conducted with various zirconates, titanates, and other inorganic modifiers admixed with the reactants. Improved results as taught herein have been obtained in each case. One composition containing 70 parts barium titanate, 14.9 parts bismuth stannate, 8.61 parts lead zirconate, and 6.39 parts lead titanate was formed by calcining together the raw ingredients going to form the barium titanate, as well as the other noted ingredients—all in the presence of bismuth stannate, as taught herein—and thereafter was fired at a maximum temperature of 1225° C. using a 3½ hour firing cycle and maintaining the maximum temperature for ½ hour. The resulting vitrified body had a dielectric constant of 990 at 25° C., a 0.3% power factor, and an aging rate of less than 0.4% at the end of 1000 hours. Between −55° C. and +85° C., the dielectric constant of this body varied between the limits of 850 and 1084.

All of the components desired in a final vitrified body need not be mixed with the barium carbonate, titanium dioxide and bismuth compound to be calcined; but instead, all ingredients other than the three essential ones required for the calcining reaction may be added to the resulting calcine at some later point in the process. For example, to a calcine such as used in preparing Example 1 hereof (or other calcine hereof as desired) may be admixed, in varying proportions, such inorganic compounds as $BaZrO_3$, $CaZrO_3$, $MgTiO_3$, $SrTiO_3$, $SrSnO_3$, $BaSnO_3$, $Bi_2(SnO_3)_3$, $Fe_2O_3$, $TiO_2$, $SnO_2$ as well as other compounds, including also the form of barium titanate known as "commercial barium titanate," if such is desired for some particular property in the final body. The foregoing listing is merely illustrative and a wide variety of inorganic additives may be employed. In general, however, the additives selected will be chosen for their effect upon the electrical properties of the final vitrified body, and they will be added in generally minor proportions, i.e., the final vitrified body will generally contain a major amount (over 50%) of barium titanate prepared as taught herein.

While we generally prefer to employ stoichiometric amounts of barium carbonate and titanium dioxide for reaction at calcining temperatures, we have found that a small excess of either barium carbonate or titanium dioxide does not upset the desired results obtained by calcination in the presence of a bismuth compound.

Vitrified bodies prepared according to the process hereof may have large or small crystal sizes without significant variation, if any, in their resistance to aging.

We have found a unique, commercially feasible and economical method for the preparation of a form of barium titanate which possesses a cubic structure, demonstrable by X-ray diffraction analysis, and which may be used in the preparation of substantially non-aging vitrified ceramic insulator bodies having a high degree of permanence in dielectric properties as taught herein.

The foregoing description is to be construed as illustrative and not limitative of the invention hereof. It will be apparent that minor variations of our invention are possible without departing from the spirit thereof.

We claim:

1. In the manufacture of a crystalline barium titanate product suitable for the production of vitrified ceramic insulator bodies possessing low power loss characteristics and a high degree of permanence in dielectric properties, the steps of mixing together components consisting essentially of barium carbonate, at least sufficient titanium dioxide for stoichiometric combination with substantially all of said barium carbonate to produce barium titanate, the amount of barium carbonate and titanium dioxide in said mixture being sufficient to form barium titanate in an amount accounting for at least a major proportion of the weight of the product formed from said mixture, a tin compound selected from the group consisting of $SnO_2$ and tin compounds yielding $SnO_2$ under calcining conditions, said tin compound being present in amount sufficient to impart low power loss characteristics, and an oxygen-containing bismuth compound, said bismuth compound being present in said mixture in an amount sufficient to account for at least about 3 parts by weight for every 100 parts by weight of barium titanate in the product, and then heating the mixture to a calcining temperature, whereby the barium carbonate and titanium dioxide react chemically to produce a crystalline barium titanate product.

2. The method of claim 1 in which the oxygen-containing bismuth compound is selected from the group consisting of $Bi_2(SnO_3)_3$, $Bi_2O_3$, and bismuth compounds which yield $Bi_2O_3$ under calcining conditions.

3. In the manufacture of vitrified ceramic bodies possessing low power loss characteristics and having a high degree of permanence in dielectric properties, the steps of (1) mixing together components consisting essentially of barium carbonate, at least sufficient titanium dioxide for stoichiometric combination with substantially all of said barium carbonate to produce barium titanate, the amount of barium carbonate and titanium dioxide in said mixture being sufficient to form barium titanate in an amount accounting for at least a major proportion of the weight of the product formed from said mixture, a tin compound selected from the group consisting of $SnO_2$ and tin compounds yielding $SnO_2$ under calcining conditions, said tin compound being present in amount sufficient to impart low power loss characteristics, and an oxygen-containing bismuth compound selected from the group consisting of $Bi_2(SnO_3)_3$, $Bi_2O_3$, and bismuth compounds which yield $Bi_2O_3$ under calcining conditions, said bismuth compound being present in said mixture in an amount sufficient to account for at least about 3 parts by weight for every 100 parts by weight of barium titanate in the product, (2) heating the mixture to a calcining temperature, whereby the barium carbonate and titanium dioxide react chemically to produce a crystalline barium titanate product, (3) shaping a body from an inorganic composition consisting essentially of said product, and (4) firing said body to vitrification.

4. The product formed according to claim 1.

5. A dense vitrified ceramic insulator body made in accordance with the method of claim 3.

6. In the manufacture of a crystalline barium titanate product adapted for use in the formation of dense vitrified ceramic insulators possessing low power loss characteristics and a high degree of permanence in dielectric properties, the steps of mixing together components consisting essentially of barium carbonate, at least sufficient titanium dioxide for stoichiometric combination with substantially all of said barium carbonate to produce barium titanate, the amount of barium carbonate and titanium dioxide in said mixture being sufficient to form barium titanate in an amount accounting for at least a major proportion of the weight of the product formed from said mixture, and $Bi_2(SnO_3)_3$, said $Bi_2(SnO_3)_3$ being present in said mixture in an amount sufficient to account for at least about 3 parts by weight for every 100 parts by weight of barium titanate in the product, and heating the mixture to a calcining temperature, whereby the barium carbonate and titanium dioxide react chemically to produce a crystalline barium titanate product.

7. The product formed according to claim 6.

8. In the manufacture of a crystalline barium titanate product suitable for the production of vitrified ceramic insulator bodies possessing low power loss characteristics and a high degree of permanence in dielectric properties, the steps of mixing together components consisting essentially of barium carbonate, titanium dioxide, a tin compound selected from the group consisting of $SnO_2$ and tin compounds yielding $SnO_2$ under calcining conditions, said tin compound being present in amount sufficient to impart low power loss characteristics, and an oxygen-containing bismuth compound, said barium carbonate and titanium dioxide being present in said mixture in amounts for substantially complete chemical reaction at calcining temperatures to produce barium titanate, said bismuth compound being present in said mixture in an amount sufficient to account for at least 3 parts by weight for every 100 parts by weight of barium titanate in the product, and then heating the mixture to a calcining temperature, whereby the barium carbonate and titanium dioxide react chemically to produce a crystalline barium titanate product.

9. The product formed according to claim 8.

10. In the manufacture of barium titanate suitable for the production of vitrified ceramic insulator bodies possessing low power loss characteristics and a high degree of permanence in dielectric properties, the steps of mixing together components consisting essentially of barium carbonate, titanium dioxide and $Bi_2(SnO_3)_3$, said barium carbonate and titanium dioxide being present in said mixture in amounts for substantially complete reaction at calcining temperatures to produce barium titanate, said $Bi_2(SnO_3)_3$ being present in said mixture in an amount sufficient to account for at least about 3 parts by weight for every 100 parts by weight of barium titanate in the product, and then heating the mixture to a calcining temperature, whereby the barium carbonate and titanium dioxide react chemically to produce a crystalline barium titanate product.

11. The product formed according to claim 10.

References Cited in the file of this patent

UNITED STATES PATENTS

| | | |
|---|---|---|
| 2,220,765 | Hirose et al. | Nov. 5, 1940 |
| 2,658,833 | Coffeen et al. | Nov. 10, 1953 |

FOREIGN PATENTS

| | | |
|---|---|---|
| 574,577 | Great Britain | 1946 |
| 579,868 | Great Britain | 1946 |

OTHER REFERENCES

Harwood et al.: Nature, "Influence of Firing Temperatures on the Preparation of Barium Titanate," vol. 165, (page 73), 1950.